United States Patent [19]

Wilkinson et al.

[11] Patent Number: 5,130,211
[45] Date of Patent: Jul. 14, 1992

[54] ELECTROLYTE SOLUTION SEQUESTERING AGENTS FOR ELECTROCHEMICAL CELLS HAVING CARBONACEOUS ELECTRODES

[75] Inventors: David P. Wilkinson, North Vancouver; Jeffery R. Dahn, Surrey, both of Canada

[73] Assignee: Her Majesty the Queen in right of the Provence of British Columbia, Canada

[21] Appl. No.: 602,497

[22] Filed: Oct. 24, 1990

[51] Int. Cl.$^5$ .............................. H01M 10/40
[52] U.S. Cl. .................................. 429/198; 429/194; 205/59
[58] Field of Search ............... 429/50, 194, 197, 198; 204/2.1

[56] References Cited

U.S. PATENT DOCUMENTS

| | | | |
|---|---|---|---|
| 4,132,837 | 1/1979 | Soffer | 429/194 |
| 4,609,600 | 9/1986 | Heinze et al. | 429/198 X |
| 4,707,423 | 11/1987 | Kalnin et al. | 429/198 X |

FOREIGN PATENT DOCUMENTS 59-151779 8/1984 Japan ..................... 429/198

Primary Examiner—Stephen Kalafut

[57] ABSTRACT

A secondary electrochemical cell including a first electrode and a counterelectrode each capable of reversibly incorporating an alkali metal, an alkali metal incorporated in at least one of the electrodes and an electrolyte solution containing an organic solvent, a salt of the alkali metal and at least one sequestering agent capable of complexing with the alkali moiety of the electrolyte salt, wherein the first electrode includes a carbon composition having a degree of graphitization greater than about 0.40. A method for intercalating alkali metal ions into a highly graphitic carbonaceous electrode material by contacting the electrode material with an electrolyte solution of an electrolyte solvent, an alkali metal electrolyte salt and at least one sequestering agent capable of complexing with the alkali metal moiety of the electrolyte salt, which electrolyte solution is also in contact with a counterelectrode, and applying a current between the electrode material and counterelectrode so that the alkali metal ions intercalate into the electrode material from the electrolyte solution, which sequestering agent substantially prevents cointercalation of the electrolyte solvent with the alkali metal ions into the electrode material.

27 Claims, 4 Drawing Sheets

ELECTROLYTE SOLUTION SEQUESTERING AGENTS FOR ELECTROCHEMICAL CELLS HAVING CARBONACEOUS ELECTRODES

BACKGROUND OF THE INVENTION

The present invention relates to means and methods for preventing the exfoliation of highly graphitic carbonaceous electrode materials used in electrochemical cells, which exfoliation is associated with the decomposition of the cell electrolyte solvent. In particular, the present invention relates to electrochemical cells having electrodes of highly graphitic carbonaceous materials and electrolyte solutions to which sequestering agents have been added to prevent co-intercalation of the electrolyte solvent into the graphite electrode during initial cell discharge, which co-intercalation causes exfoliation of the graphite electrode.

Electrochemical cells useful as electrical storage batteries usually incorporate a metal-containing anode and a cathode including an active material which can take up ions of the metal. An electrolyte incorporating ions of the metal is disposed in contact with the anode and the cathode. During discharge of the cell, metal ions leave the anode, enter the electrolyte and are taken up in the active material of the cathode, resulting in the release of electrical energy. Provided that the reaction between the metal ions and the cathode-active material is reversible, the process can be reversed by applying electrical energy to the cell. If such a reversible cathode-active material is provided in a cell having the appropriate physical configuration and an appropriate electrolyte, the cell can be recharged and reused. Rechargeable cells are commonly referred to in the battery art as "secondary" cells.

It has long been known that useful secondary cells can be made using a light alkaline metal such as sodium, potassium, and particularly, lithium, as the source of the metal ions exchanged between the anode and cathode through the electrolyte. These metals are particularly useful in combination with a cathode-active material that is a sulfide or oxide of a transition metal, i.e., a metal capable of assuming plural different valence states. In the past, these alkaline metals such as lithium have been used in electrochemical cells in their pure metal state, as the cell counterelectrode in combination with the transition metal cathode-active material. See, for example, Dampier, *J. Electrochem. Soc.*, 121(5), 656-660 (1974). It is common knowledge that water reacts violently with alkaline metals such as sodium, potassium and lithium in their pure metal state. Not only must water be excluded from any component of the cell having an alkaline metal counterelectrode, extreme care must be taken during cell assembly to avoid exposure of the counterelectrode metal material to ambient moisture and other sources of water.

Secondary lithium cell researchers have sought to develop a rechargeable lithium cell containing no metallic lithium. Cells have been developed using instead of a lithium metal anode, a lithium intercalation host that operates near the potential of lithium, such as the carbonaceous materials and cells incorporating same disclosed in presently co-pending U.S. patent application Ser. No. 350,396 by Fong et al., filed May 11, 1989, the disclosure of which application is hereby incorporated herein by reference thereto.

Replacing lithium metal counterelectrodes with lithium intercalation host counterelectrodes removes the restrictions lithium metal electrodes place upon cell design and choice of electrolytes and also the adverse effect lithium metal places upon cycling performance and safety in the finished cell. Highly graphitic carbonaceous materials are ideal lithium intercalation hosts. Highly graphitic carbonaceous materials such as graphite are inexpensive, non-toxic and are capable of incorporation into electrochemical cells having relatively high specific capacities. As noted in the above-cited U.S. patent application Ser. No. 350,396, the drawback to use of such materials is that upon the initial charging of the cell, when lithium is intercalated into the host, an irreversible reaction occurs in which lithium and the cell electrolyte solvent are consumed, resulting in an initial capacity loss for the cell and a reduction of the cell's overall performance. The above patent application correlates this reaction to the tendency of highly graphitic carbonaceous intercalation hosts to exfoliate when initially intercalated with lithium metal. The cited application defines exfoliation as the change in an intercalation host material resulting in an increase in its surface area subsequent to intercalation with lithium metal as compared to the surface area prior to intercalation. It is disclosed in the cited application that highly graphitic carbonaceous materials have an organized layered structure, which layers are easily separated or exfoliated. It is disclosed that the amount of electrolyte consumed upon initial intercalation is substantially proportional to the surface area of the carbonaceous intercalation host, so that the exfoliation of highly graphitic carbonaceous intercalation hosts upon initial charging results in the consumption of greater electrolyte solvent and loss of cell capacity and performance properties than occurs with carbonaceous or other intercalation hosts that do not suffer from exfoliation.

U.S. patent application Ser. No. 350,396 offers two solutions to the problem of exfoliation of highly graphitic carbonaceous intercalation hosts to prevent the excessive consumption of cell electrolyte solvent and consequent loss of cell capacity and performance properties. The first is to form a dual phase carbonaceous intercalation host having a mean degree of graphitization of at least about 0.40, with one phase having a degree of graphitization greater than 0.40 and the other phase having a degree of graphitization less than about 0.40. The other approach maintains the carbonaceous intercalation host at a temperature greater than about 50° C. during the initial intercalation of the host with lithium. Both approaches provide a carbonaceous intercalation host resistant to exfoliation during the initial lithium intercalation. However, a solution to the exfoliation problem that does not require the replacement of single-phase highly graphitic intercalation hosts or the heat treatment of same would be highly desirable.

Co-intercalation of electrolyte solvent with lithium into $TiS_2$ and $ZrS_2$ host electrodes is disclosed by McKinnon, *J. Electrochem. Soc.*, 132(2), 364 (1985). Morita et al., *J. Electro. Soc.*, 134(9), 2107 (1987) disclose that the addition of crown ether sequestering agents to electrolyte solutions limits solvent co-intercalation into $TiS_2$ electrode hosts. U.S. Pat. No. 4,132,837 to Soffer discloses that the addition of sequestering agents such as crown ethers to electrolyte solutions reduces the tendency of the electrolyte solvent to degrade in the presence of lithium metal anodes. None of these references, however, provide any guidance as to how to solve the exfoliation problem.

SUMMARY OF THE INVENTION

It has now been discovered that the addition of a sequestering agent such as a glyme, crown ether or cryptand to electrolyte solutions of secondary cells having highly graphitic carbonaceous anode materials prevents exfoliation of the material upon the initial intercalation of an alkali metal such as lithium. Accordingly, one aspect of the present invention provides a secondary electrochemical cell having a first electrode and a counterelectrode each capable of reversibly incorporating an alkali metal, an alkali metal incorporated in at least one of the electrodes and an electrolyte solution of a salt of the alkali metal and at least one sequestering agent dissolved in an organic solvent, wherein the first electrode includes a single-phase carbonaceous material having a degree of graphitization greater than about 0.40.

The term "degree of graphitization" refers to a parameter of the microstructure of the carbonaceous material having a numerical value between 0 and 1.0. In general, carbon having a high degree of graphitization has a more ordered microstructure more closely resembling the microstructure of graphite, whereas carbon having a low degree of graphitization has a less ordered microstructure more closely resembling that of coke. Carbon having a high degree of graphitization provides significant advantages with respect to charge capacity and also with respect to variation of cell voltage with state of charge during operation.

Another aspect of the present invention provides a method for intercalating alkali metal ions into a highly graphitic carbonaceous electrode material by contacting the electrode material with an electrolyte solution of an electrolyte solvent, an alkali metal electrolyte salt, and at least one sequestering agent capable of complexing with the alkali moiety of the electrolyte salt, which electrolyte solution is also in contact with a counterelectrode, and applying a current between the electrode material and counterelectrode so that the alkali metal ions intercalate into the electrode material from the electrolyte solution, which sequestering agent substantially prevents cointercalation of the electrolyte solvent with the alkali metal ions into the electrode material.

The electrochemical cells and methods of the invention solve the exfoliation and initial capacity loss problems in the use of highly graphitic carbonaceous materials as alkali metal intercalable anode materials in electrochemical cells.

Without being bound by any particular theory of operation, it is believed that electrolyte solvent decomposition occurs during the first cell discharge, when the electrolyte solvent reacts with the carbonaceous anode material to form a passivating film on the surface of the carbonaceous material that is insoluble in the electrolyte solvent. During this reaction, the electrolyte solvent decomposes and is consumed until all the available surface area of the carbonaceous material is coated with the passivating film of the electrolyte solvent decomposition products, which film coating is an ionic conductor for alkali ions but an electronic insulator.

It is further believed that the alkali ions in the electrolyte solution are coordinated by a solvation sphere made up of molecules of the electrolyte solvent. The ions typically have a diameter of two Angstroms, while the solvation sphere is typically ten times the size. During intercalation, the electrolyte solvent solvation sphere may be co-intercalated with the alkali ions into the highly graphitic carbonaceous anode material, and when this occurs, the organized layered structure of the graphitic material separates. This is defined as exfoliation, which creates freshly exposed carbonaceous surfaces with which more electrolyte decomposition can occur.

Accordingly, it is believed that by preventing solvent co-intercalation into the highly graphitic carbonaceous anode material during cell charging by the addition to the electrolyte solution of sequestering agents, exfoliation of the carbonaceous electrode material is eliminated, thereby significantly reducing the anode surface area available for decomposition of the electrolyte solvent. Furthermore, the electrolyte solvent decomposition is significantly reduced without resort to less graphitic carbon phases or heat treatment of the carbonaceous anode material during initial alkaline intercalation.

These and other aspects of the present invention will become apparent, as will a better understanding of the structure and operation of the present invention, when reference is made to the description which follows, taken with the drawings in which:

DETAILED DESCRIPTION OF THE PREFERRED EMBODIMENT

Figure 1:
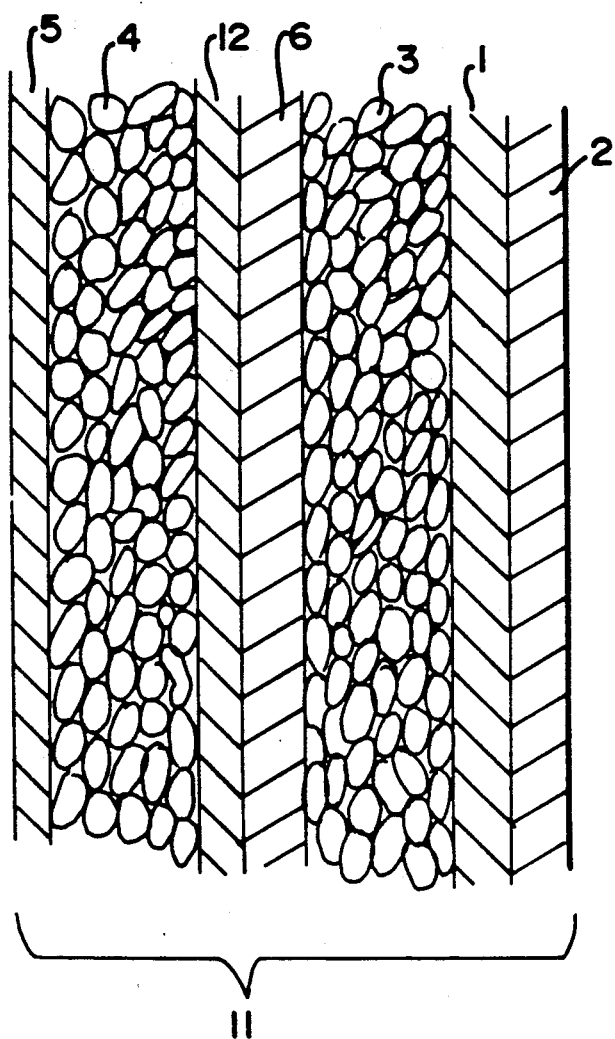
FIG. 1 is a schematic, idealized view of an electrode assembly according to one embodiment of the invention.
Figure 2:
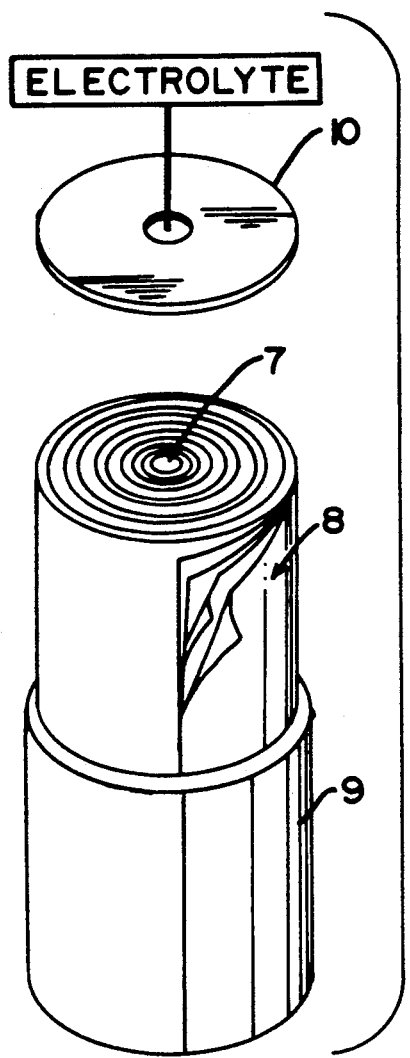
FIG. 2 is a schematic, idealized view of a cell according to one embodiment of the invention.

A non-aqueous secondary cell according to one embodiment of the present invention is depicted in FIGS. 1 and 2. FIG. 1 depicts a typical electrode assembly in which a current collector 1 supported by a backing 2 on which the cathode 3 of an electrochemically active material in particulate form is layered. Anode 4 is layered on conductive metallic support 5 and the two electrodes are sandwiched with a porous separator 6, such as a sheet of porous polypropylene, disposed therebetween to form a sheet-like flexible sandwich 11. As depicted in FIG. 2, this layered assembly is wound around a metallic center post 7 to form a spiral assembly 8. The spiral assembly is then placed into the cell container 9, which is covered with a cell cap 10. The conductive metallic support 5 and current collector 1 are connected by conventional means that are not shown with container 9 and cap 10, respectfully. The container 9 and cap 10 are insulated from each other and serve as terminals for the finished cell.

Because a lithium metal anode is not used, the cell need not incorporate means for applying pressure on the anode. Such "stack pressure" in lithium metal anode cells minimizes dendritic and spongy growths on the lithium that gradually reduce cell capacity and ultimately contact the cathode, causing the cell to fail.

Both electrodes are in contact with an electrolyte solution including an electrolyte salt of an alkali metal dissolved in one or more organic solvents, which electrolyte salt is not capable of being oxidized in the cell at the fully charged potential. Also dissolved in the electrolyte solvent are one or more sequestering agents capable of complexing with the alkali metal moiety of the electrolyte salt.

Sequestering agents capable of complexing with the alkali moiety of the electrolyte salt include glymes and macroheterocyclic compounds such as crown ethers, and structurally related cryptands. Examples of glymes suitable for use with the present invention include those disclosed in co-pending and commonly owned U.S. patent application Ser. No. 524,175, the disclosure of which is hereby incorporated herein by reference thereto.

As explained in the above-cited co-pending patent application, glyme is a generic name for a family of glycoldiethers having the basic formula RO—$(C_2H_4O)_n$—$OR_1$ where n is generally between about 1 and about 20 and R and $R_1$ can be the same or different and generally include short chain normal alkanes. A monoglyme has an n of 1, a diglyme has an n of 2, a triglyme has an n of 3, a tetraglyme has an n of 4, and so on. Dimethoxy ethane, also known as methyl monoglyme, or DME has a formula $CH_3OC_2H_4OCH_3$. Diethoxy ethane or ethyl monoglyme has a formula $C_2H_5OC_2H_4OC_2H_5$. Methyl triglyme has a formula of $CH_3O(C_2H_4O)_3CH_3$. Methyl tetraglyme has a formula $CH_3O(C_2H_4O)_4CH_3$. Typical glymes suitable for use with the present invention have n between 1 and about 20 and R and $R_1$ independently selected from normal alkanes up to four carbon atoms in length. Preferred glymes have n between 1 and about 10, with R and $R_1$ being selected from normal alkanes up to two carbon atoms in length. The most preferred glymes are methyl monoglyme, ethyl monoglyme, methyl diglyme, methyl triglyme and methyl tetraglyme.

It is known to use glymes as electrolyte solvents with lithium metal anode cells. Until now, it was not known that the use of glymes with cells having highly graphitic carbonaceous anode materials would prevent the exfoliation of the graphitic structure of the anode.

Crown ethers are macrocyclic polyethers containing repetitive units of the structure —C—C—O— or —C—C—C—O—. The resulting compound is a rigid heterocycle with a bi-dimensional cavity disposed within the center of the macromolecule with the ethereal oxygens facing inwardly of the cavity in coplanar fashion. Cryptands are similar in structure to crown ethers with the exception that two hetero oxygens are replaced in the latter with tertiary nitrogen atoms so as to enable the formation of a third crossing chain.

Examples of crown ethers suitable for use with the present invention are those described in U.S. Pat. Nos. 3,562,295; 3,687,978 and 3,987,061 to Pedersen, the disclosures of which are hereby incorporated herein by reference thereto.

Preferred crown ethers include 12 crown 4 ether, benzo 14 crown 4 ether, dicyclohexyl 18 crown 6 ether, 15 crown 5 ether, 18 crown 6 ether and 21 crown 7 ether. More preferred crown ethers include 12 crown 4 ether, 15 crown 5 ether and 18 crown 6 ether. The selection of a crown ether for use with a particular alkaline moiety can be readily determined by one of ordinary skill in the art without undue experimentation. The objective is the selection of a crown ether having atoms of optimum cavity size to permit penetration of the guest cation without penetration of the electrolyte solvent. This is best determined by preparing test cells in accordance with the present invention and determining with which materials the least amount of cell capacity loss occurs. The most preferred crown ether for lithium cations is 12 crown 4 ether, while for sodium cations, the most preferred crown ether is 15 crown 5 ether.

Examples of cryptands suitable for use with the present invention include cryptand 211, cryptand 221 and cryptand 222. Other macroheterocyclic compounds suitable for use with the present invention include crown, lantern and clam macrocyclic hetero imine compounds of U.S. Pat. No. 3,848,949 to Pedersen; macromonocyclic compounds of U.S. Pat. No. 3,966,766 to Lehn; multiheteromacrocycles of U.S. Pat. Nos. 3,965,116 and 4,001,279 to Cram; aroylcrownethers of U.S. Pat. Nos. 3,997,565 and 4,024,158 to Kauer; the macroheterocyclic complexes of U.S. Pat. No. 3,686,225 to Pedersen and the nitrogen-containing chelating agents of U.S. Pat. No. 4,670,363 to Whitney, the disclosures all of which are hereby incorporated herein by reference thereto.

With respect to the other cell components of the present invention, the anode includes highly graphitic carbonaceous materials capable of reversibly intercalating alkali metals, the exfoliation of which is prevented by the addition of the sequestering agents of the present invention to the electrolyte solution. The highly graphitic carbonaceous anode materials suitable for use with the present invention have a degree of graphitization above about 0.40, preferably above 0.80 and most preferably about 1.0. As used in this disclosure, the term "degree of graphitization" refers to the value g according to the formula:

$$g = \frac{3.45 - d(002)}{0.095}$$

where d(002) is the spacing between the graphitic layers of the carbons in the crystal structure measured in Angstrom units. The spacing d between graphite layers is measured by standard X-ray diffraction techniques. The positions of diffraction peaks corresponding to the (002), (004) and (006) Miller Indices are measured, and standard least-squares techniques are employed to derive spacing which minimizes the total error for all of these peaks. Examples of highly qraphitic carbonaceous anode materials include graphites such as synthetic graphites including Lonza KS graphite powders, Lonza T graphite powders, Kish graphite and the like and natural graphites from various sources, as well as other carbonaceous materials such as petroleum cokes heat treated at temperatures above 2100° C., carbons prepared by chemical vapor deposition or pyrolysis of hydrocarbons and the like.

The highly graphitic carbonaceous anode materials of the present invention may contain non-carbon components so long as the crystal structure of the materials maintains the required degree of graphitization. For example, boron-carbon-nitrogen materials are known having a highly graphitic suitable crystal structure that are disclosed in Kaner, et al., *Mat. Res. Bull.*, 22, 399–404 (1987), the disclosure of which is hereby incorporated herein by reference thereto. Generally, any carbon-containing material, the crystal structure of which possesses the required degree of graphitization, is suitable for use with the present invention.

Suitable alkali metals, the ions of which are exchanged between the cathode and anode include sodium, potassium and lithium. The preferred alkali metal is lithium.

Suitable cathode materials include metal-chalcogen combinations, particularly transition metal-chalcogen combinations, metal halides, and the like. Chalcogens are understood by those of ordinary skill in the art to include the chemically-related elements from Group VI of the periodic table, namely oxygen, sulfur, selenium, tellurium and polonium. Preferred transition metals include manganese, nickel, iron, chromium, titanium, vanadium, molybdenum and cobalt. Preferred compositions include molybdenum sulfides, vanadium oxides and manganese oxides. $MoS_2$, $V_6O_{13}$, $Mo_6S_8$ and $MnO_2$ are more preferred, with $MnO_2$ being most preferred. Even more preferred is the gamma-phase $MnO_2$ disclosed in commonly-owned U.S. Pat. No. 4,959,282 to Dahn, the disclosure of which is hereby incorporated herein by reference thereto.

Lithiated carbon is a reactive material that is difficult to handle in air. Preferably, it is produced in-situ in the cell. This can be accomplished by placing a sheet of lithium metal between the anode and porous separator so that the lithium sheet lies adjacent to, and in contact with the anode, as disclosed in the above-cited U.S. patent application Ser. No. 350,396 to Fong. The addition of the electrolyte to the cell causes the lithium metal in the sheet to intercalate into the carbonaceous anode material, because the lithium metal has a higher electrochemical potential than the anode.

Alternatively, this sacrificial or consumable mass of lithium may be omitted, and the cell assembled with a lithiated cathode-active material. In such a case, the cell, when assembled, is in the discharged state. The carbonaceous anode material is lithiated by applying an externally generated electrical potential in order to charge the cell and draw lithium to the cathode-active material, through the electrolyte and into the carbonaceous anode material. This approach ordinarily is most practical when the cathode-active material, in its lithiated form, is stable in air and, hence, can be handled readily. Examples of such air-stable lithiated cathode materials include lithiated nickel oxide, the preparation of which for cathode fabrication is disclosed in co-pending U.S. patent application Ser. No. 556,754 to Dahn, lithiated cobalt oxides and lithiated mixed oxides of cobalt with nickel or tin. Among the suitable oxides are $LiNiO_2$, $LiCoO_2$, $LiMn_2O_4$, $LiCo_{0.92}Sn_{0.08}O_2$ and $LiCo_{1-x}Ni_xO_2$. Other less air-stable lithiated cathode-active material suitable for use with the present invention include the lithiated chevrel-phase materials disclosed in U.S. Pat. No. 4,917,871 to Dahn and the lithiated manganese dioxides disclosed in U.S. Pat. No. 4,959,282 to Dahn.

The cathode may include the cathode-active material in particulate form with a suitable inner polymeric binder, such as the polymer of ethylene propylene diene monomer, commonly referred to as EPDM, a polyfluorinated hydrocarbon such as polytetrafluoroethylene (PTFE), or polyethylene oxide (PEO). Preferably, about 2% by weight or less of the polymer to cathode material is used.

It is desirable that the cathode maintain its electrical conductivity at all states of charge. Conductivity may be enhanced by adding an electrically-conductive chemically-inert material, such as a carbonaceous material like graphite or carbon black, to the cathode.

In assembling the cells of the present invention, the cathode is typically fabricated by depositing a slurry of the cathode material, the electrically conductive inert material, the binder and a fugitive liquid carrier such as cyclohexane, on the cathode current collector, and then evaporating the carrier to leave a coherent mass in electrical contact with the current collector.

Likewise, the anode may include the highly graphitic carbonaceous anode material in particulate form with a suitable inert polymeric binder at a level of about 2% by weight or less of polymer to anode material. Expansion and contraction of the anode during cell cycling can cause the carbonaceous particles to lose electrically conductive contact with one another. Conductivity can be similarly enhanced by adding an electrically-conductive material, such as carbon black, to the anode material.

In assembling the cell of the present invention, the anode is similarly fabricated by depositing a slurry of the highly graphitic carbonaceous anode material, the electrically-conductive inert material, the binder and a fugitive liquid carrier such as hexane on the electrically-conductive anode support and then evaporating the carrier to leave a coherent mass in electrical contact with the support.

The cathode assembly is then combined with the anode assembly with the porous polymeric electrode separator sandwiched therebetween. If the cathode-active material is non-lithiated or insufficiently lithiated, a sheet of lithium metal foil is sandwiched between either the anode assembly or the cathode assembly and the porous separator. As shown in FIG. 1, a sheet of lithium foil 12 is placed between anode 4 and separator 6 so that the surface of the sheet is coextensive with the surface of the anode and the thickness of the sheet is chosen so that the correct amount of lithium is present for intercalation into the anode. The layered assembly is then wound around the metallic center post to form a spiral assembly that is then placed into the cell container to which is added the electrolyte solution into which the sequestering agent has been dissolved. The cell container is then covered with the cell cap.

The electrolyte solution includes an electrolyte salt of the alkali metal exchanged between the cathode and anode dissolved in the electrolyte solvent. The electrolyte salt should be compatible with both the cathode-active material, the highly graphitic carbonaceous anode material and the sequestering agent. When the alkali metal is lithium, suitable lithium electrolyte salts include $LiAsF_6$, $LiPF_6$, $LiClO_4$, $LiBF_4$, $LiB(C_6H_5)_4$, $LiCF_3SO_3$, $LiN(CF_3SO_2)_2$, $LiSO_3F$, $LiAlCl_4$, $LiBr$, and mixtures thereof. $LiAsF_6$, $LiCF_3SO_3$, $LiN(CF_3SO_2)_2$ and mixtures thereof are preferred. The concentration of the lithium compound in the electrolyte solvent preferably is about 0.5 molar to 1.5 molar and, more preferably, is about 1.0 molar.

The electrolyte solvent preferably includes ester solvents, such as propylene carbonate (PC), ethylene carbonate (EC), butylene carbonate or mixtures thereof. When the solvent includes both PC and EC, the ratio of PC to EC by volume is preferably about 1:3 to about 3:1, more preferably about 1:2 to 2:1, and even more preferably, about 1:1. Other solvents may be used such as 2-methyl tetrahydrofuran (2-MTHF), tetrahydrofuran, sulfolane, dimethylsulfite, p-dioxane, 1,3-dioxane, dimethoxyethane (DME) and diethylether. Of the lower viscosity solvents, DME is preferred. One useful electrolyte solvent includes about 50% DME and 50% EC, all by volume. References in this disclosure to percentages of solvent ingredients by volume should be understood as referring to the volume of the individual ingredients prior to mixing.

DME is a glyme. When included in the electrolyte solvents for use in combination with the highly graphitic carbonaceous anode materials of the present invention, the glymes also function as sequestering agents. While not essential, one or more other sequestering agents such as crown ethers may also be dissolved in the electrolyte solvent. However, a cell having an electrolyte solvent containing a glyme and no other sequestering agent is defined as including a sequestering agent in accordance with the present invention.

The electrolyte solution also includes at least one of the sequestering agents of the present invention dissolved in the electrolyte solvent, at a molar concentration at least about equal to the molar concentration of the electrolyte salt. That is, the molar ratio of sequestering agent to electrolyte salt is preferably greater than about 1:1. The ratio is more preferably greater than about 2:1. The concentration of sequestering agent will depend upon the efficiency with which the sequestering agent complexes with the alkali metal moiety. The most efficient sequestering agent for lithium cations is 12 crown 4 ether. Accordingly, the preferred molar ratio of 12 crown 4 ether to electrolyte salt is about 1:1. The efficiency of a sequestering agent can be readily determined by one of ordinary skill in the art without undue experimentation. Like the selection of a crown ether, this is best determined by preparing test cells in accordance with the present invention and determining the degree of cell capacity loss that occurs with each sequestering agent.

The following examples serve to provide further appreciation of the invention, but are not meant in any way to restrict the effective scope of the invention.

EXAMPLES

EXAMPLES 1-3

Three test cells are assembled using a lithium metal anode, a graphite cathode and an electrolyte of 1M $LiAsF_6$ in PC electrolyte solvent. No sequestering agent is used in the cell of Example 1. 12 crown 4 ether is added to the electrolyte solvent of the cell of Example 2 at a solution concentration of 1M. The electrolyte solvent of the cell of Example 3 has a 1M concentration of tetraglyme.

Figure 3:
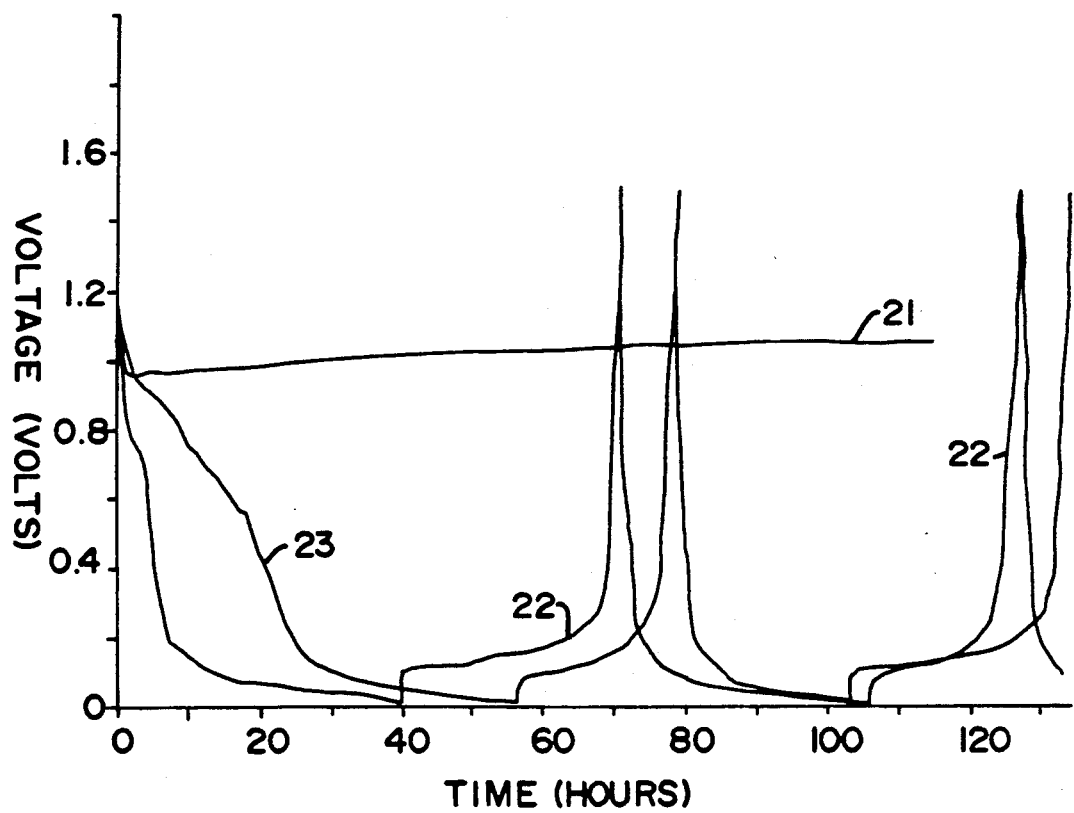
FIGS. 3 and 4 are graphs showing cell voltages versus time for Li/graphite cells having various electrolyte sequestering agent additives compared to control cells having no additives.

The cells are then discharged to transfer lithium metal from the anode to the graphite, where it intercalates or reacts with electrolyte using the same discharge currents for each cell, which discharge currents correspond to a change of $x=1$ in $Li_xC_6$ in 40 hours in the absence of irreversible reactions. Voltage-time curves of the initial discharging and subsequent cycling are shown in FIG. 3. The cells of Examples 2 and 3 with sequestering agents show minimal irreversible capacity 22, 23 during the first discharge, while the cell of Example 1 without sequestering agent shows only irreversible capacity 21. In the cell of Example 1, the decomposition reactions do not stop until substantially all the electrolyte in the cell is decomposed.

EXAMPLES 4-6

Figure 4:
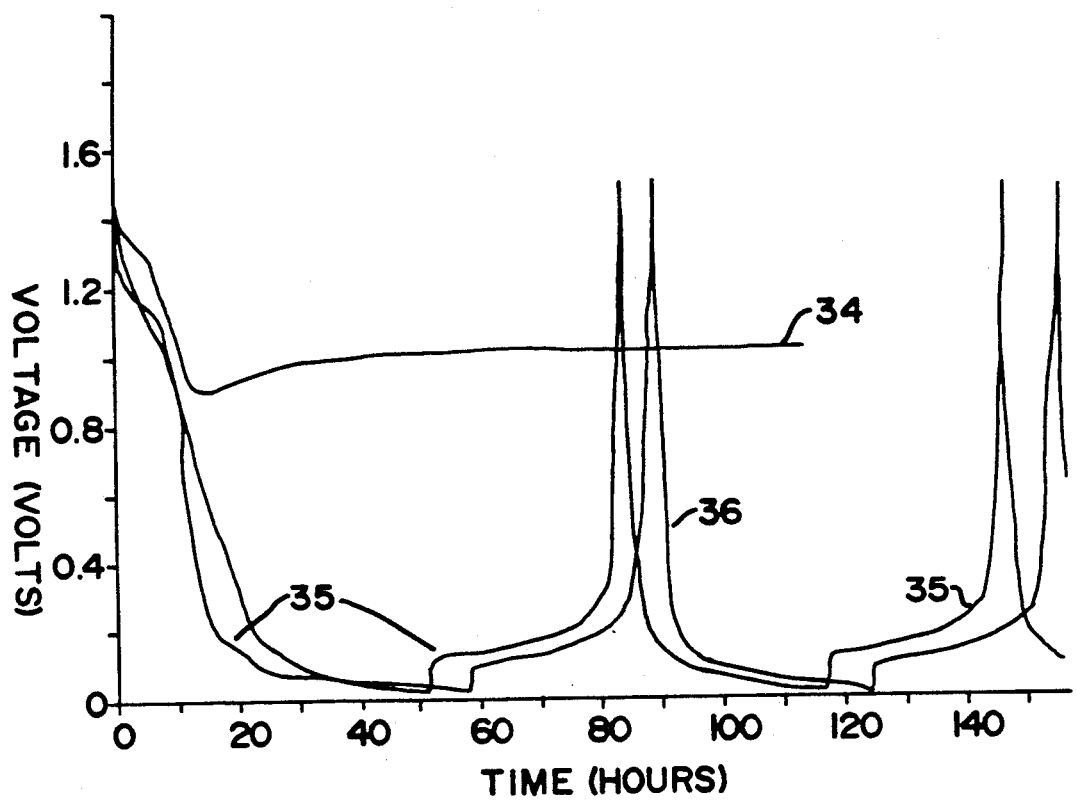

Three test cells are prepared as in Examples 1-3, using $LiN(CF_3SO_2)_2$ as the electrolyte salt instead of $LiAsF_6$. The cells are cycled as in Examples 1-3 and voltage-time curves of the cycling are shown in FIG. 4. Similar results are observed, with the cells of Examples 5 and 6 with sequestering agents showing minimal irreversible capacity 35, 36 during the first discharge, while the cell of Example 4 without sequestering agent show only irreversible capacity 34, with decomposition reactions continuing until substantially all the electrolyte in the cell is decomposed.

Table I summarizes the effect of sequestering agent addition to the electrolyte solvent of Li/graphite cells:

TABLE I

| EXAMPLE | IRREVERSIBLE CAPACITY DURING FIRST DISCHARGE (Ah/g) | REVERSIBLE CAPACITY (Ah/g) |
|---|---|---|
| 1 | >0.85 | <0.05 |
| 2 | 0.14 | 0.24 |
| 3 | 0.22 | 0.23 |
| 4 | >0.85 | <0.05 |
| 5 | 0.07 | 0.25 |
| 6 | 0.256 | 0.17 |

The foregoing examples establish that the addition of sequestering agents to the electrolyte solvents of electrochemical cells having highly graphitic carbonaceous anode materials virtually eliminates the irreversible capacity that occurs on the first intercalation of lithium into the highly graphitic carbonaceous anode materials, with a consequential improvement in the cycling capacity of the cells.

As will be readily appreciated, numerous variations and combinations of the features set forth above can be utilized without departing from the present invention as set forth in the claims. Such variations are not regarded as a departure from the spirit and scope of the invention, and all such modifications are intended to be included within the scope of the following claims.

What is claimed is:

1. A secondary electrochemical cell comprising an anode containing a material capable of reversibly incorporating an alkali metal, a cathode capable of reversibly incorporating an alkali metal, an alkali metal incorporated in at least one of said anode and cathode and an electrolyte comprising an organic solvent, a salt of said alkali metal and at least one sequestering agent capable of complexing with the alkali moiety of said electrolyte salt, wherein said anode material consists essentially of a carbonaceous material having a degree of graphitization greater than about 0.40.

2. The cell of claim 1, wherein said degree of graphitization is greater than about 0.80.

3. The cell of claim 2, wherein said degree of graphitization is about 1.00.

4. The cell of claim 1, wherein said carbonaceous material is a highly graphitic carbonaceous material selected from the group consisting of highly graphitic boron-carbon-nitrogen compounds, synthetic graphites, natural graphites, petroleum cokes, heat-treated at temperatures above 2100° C. and carbons prepared by chemical vapor deposition or pyrolysis of hydrocarbons.

5. The cell of claim 1, wherein said alkali metal is lithium.

6. The cell of claim 1, wherein said at least one sequestering agent is selected from the group consisting of glymes, crown ethers, cryptands and combinations thereof.

7. The cell of claim 6, wherein said sequestering agent includes a glyme having a structure represented by the formula:

wherein n is between 1 and about 20 and R and $R_1$ are independently selected from the group consisting of short-chained normal alkanes up to about four carbon atoms in length.

8. The cell of claim 7, wherein n is between 1 and about 10 and R and $R_1$ are independently selected from the group consisting of normal alkanes up to two carbon atoms in length.

9. The cell of claim 8, wherein said glymes are selected from the group consisting of methyl monoglyme, ethyl monoglyme, methyl diglyme, methyl triglyme and methyl tetraglyme.

10. The cell of claim 6, wherein said sequestering agent includes a crown ether selected from the group consisting of 12 crown 4 ether, benzo 14 crown 4 ether, dicyclohexyl 18 crown 6 ether, 15 crown 5 ether, 18 crown 6 ether and 21 crown 7 ether.

11. The cell of claim 10, wherein said crown ether is 12 crown 4 ether.

12. The cell of claim 1, wherein said molar ratio of said sequestering agent to said electrolyte salt is greater than about 1:1.

13. The cell of claim 1, wherein said electrolyte solution comprises one or more solvents selected from the group consisting of ethylene carbonate, propylene carbonate, butylene carbonate, 2-methyl tetrahydrofuran, tetrahydrofuran, sulfolane, dimethylsulfite, p-dioxane, 1,3-dioxane, dimethyl ether and diethoxyethane.

14. The cell of claim 13, wherein said electrolyte solution comprises propylene carbonate and ethylene carbonate in a ratio by volume between about 1:3 and about 3:1.

15. The cell of claim 14, wherein said electrolyte solution comprises 50% by volume dimethoxyethane and 50% by volume ethylene carbonate.

16. The cell of claim 1, wherein said alkali metal electrolyte salt is selected from the group consisting of $LiAsF_6$, $LiPF_6$, $LiClO_4$, $LiBF_4$, $LiB(C_6H_5)_4$, $LiCF_3SO_3$, $LiN(CF_3SO_2)_2$, $LiSO_3F$, $LiAlCl_4$, $LiBr$ and mixtures thereof.

17. The cell of claim 16, wherein said alkali metal electrolyte salt is selected from the group consisting of $LiAsF_6$, $LiCF_3SO_3$, $LiN(CF_3SO_2)_2$ and mixtures thereof.

18. The cell of claim 1, wherein said cathode comprises a transition metal chalcogenide material.

19. The cell of claim 18, wherein said transition metal is selected from the group consisting of manganese, nickel, iron, chromium, titanium, vanadium, molybdenum, cobalt and mixtures thereof.

20. The cell of claim 18, wherein said transition metal chalcogenide is lithiated.

21. A method for intercalating alkali metal ions into a highly graphitic carbonaceous electrode material, said method comprising the steps of:

contacting said electrode material with an electrolyte solution of an electrolyte solvent, an alkali metal electrolyte salt and at least one sequestering agent capable of complexing with the alkali metal moiety of said electrolyte salt, which electrolyte solution is also in contact with a counterelectrode; and applying a current between said highly graphitic carbonaceous electrode material and said counterelectrode so that said alkali metal ions intercalate into said highly graphitic carbonaceous electrode material from said electrolyte solution;

whereby said sequestering agent substantially prevents cointercalation of said electrolyte solvent with said alkali metal ions with said highly graphitic carbonaceous electrode material.

22. The method of claim 21, wherein said highly graphitic carbonaceous electrode material has a degree of graphitization greater than about 0.40.

23. The method of claim 21, said sequestering agents are selected from the group consisting of glymes, crown ethers and cryptands.

24. The method of claim 21, wherein said electrolyte solution comprises one or more solvents selected from the group consisting of ethylene carbonate, propylene carbonate, butylene carbonate, 2-methyl tetrahydrofuran, tetrahydrofuran, sulfolane, dimethylsulfite, p-dioxane, 1,3-dioxane, dimethoxyethane and diethyl ether.

25. The method of claim 21, wherein said alkali metal electrolyte salt is selected from the group consisting of $LiAsF_6$, $LiPF_6$, $LiClO_4$, $LiBF_4$, $LiB(C_6H_5)_4$, $LiCF_3SO_3$, $LiN(CF_3SO_2)_2$, $LiSO_3F$, $LiAlCl_4$, $LiBr$ and mixtures thereof.

26. The method of claim 21, wherein said counterelectrode includes a transition metal chalcogenide material.

27. The cell of claim 21, wherein said transition metal is selected from the group consisting manganese, nickel, iron, chromium, titanium, vanadium, molybdenum, cobalt and mixtures thereof.

* * * * *